US007344612B2

(12) United States Patent
Sakurai et al.

(10) Patent No.: US 7,344,612 B2
(45) Date of Patent: Mar. 18, 2008

(54) PRODUCTION METHOD OF MULTILAYER ELECTRONIC DEVICE

(75) Inventors: Toshio Sakurai, Chuo-ku (JP); Shigeki Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/188,090

(22) Filed: Jul. 25, 2005

(65) Prior Publication Data
US 2006/0021691 A1 Feb. 2, 2006

(30) Foreign Application Priority Data
Jul. 27, 2004 (JP) .............................. 2004-218642
Sep. 30, 2004 (JP) .............................. 2004-287847

(51) Int. Cl.
*C03B 29/00* (2006.01)
*H01G 4/30* (2006.01)
(52) U.S. Cl. ................................. 156/89.12; 156/89.16
(58) Field of Classification Search ............ 156/89.12, 156/89.16, 275.5
See application file for complete search history.

(56) References Cited

U.S. PATENT DOCUMENTS

| 3,998,917 | A | * | 12/1976 | Adelman ..................... 264/212 |
| 4,587,068 | A | * | 5/1986 | Borase et al. ................ 264/212 |
| 5,935,358 | A | * | 8/1999 | Yamasaki ................. 156/89.12 |
| 6,475,317 | B1 | * | 11/2002 | Baba et al. ............... 156/89.12 |
| 6,579,394 | B1 | * | 6/2003 | Nakamura et al. ........ 156/89.12 |
| 6,589,446 | B1 | * | 7/2003 | Nakamura et al. ......... 252/363.5 |
| 6,599,463 | B2 | * | 7/2003 | Miyazaki et al. ............ 264/614 |
| 6,607,690 | B2 | * | 8/2003 | Anahara et al. ............. 264/614 |
| 6,704,191 | B2 | * | 3/2004 | Hattori ..................... 361/321.3 |
| 2003/0111158 | A1 | * | 6/2003 | Okuyama et al. ......... 156/89.12 |
| 2004/0163555 | A1 | * | 8/2004 | Ishimoto et al. ............. 101/170 |
| 2005/0194084 | A1 | * | 9/2005 | Yoshida et al. .......... 156/89.11 |

FOREIGN PATENT DOCUMENTS

| DE | 1 282 119 | * | 11/1968 |
| JP | 57-40913 | * | 3/1982 |
| JP | 62-223056 | * | 10/1987 |
| JP | 63-25260 | * | 2/1988 |

(Continued)

OTHER PUBLICATIONS

T. Chartier et al., "UV Curable Systems for Tape Casting," Journal of the European Ceramic Society, vol. 19, pp. 67-74, (1999).*

(Continued)

*Primary Examiner*—Melvin Mayes
(74) *Attorney, Agent, or Firm*—Oliff & Berridge, PLC

(57) ABSTRACT

A production method of a multilayer electronic device, comprising the steps of forming a lower side green sheet 10a including at least a ceramic powder on a supporting body 20; forming an electrode pattern layer 12a on a surface of the lower side green sheet; forming a green chip by stacking multilayer units U1 including at least the lower side green sheet and an electrode pattern layer; and firing the green chip; wherein the lower side green sheet 10a formed on the supporting body 20 includes a binder of a curable resin, and the curable resin in the lower side green sheet 10a is cured before forming said electrode pattern layer 12a on the lower side green sheet.

5 Claims, 5 Drawing Sheets

FOREIGN PATENT DOCUMENTS

| | | | |
|---|---|---|---|
| JP | 63-100051 | * | 2/1988 |
| JP | 63-64953 | * | 3/1988 |
| JP | 63-242603 | * | 10/1988 |
| JP | 4-270164 | * | 9/1992 |
| JP | 5-4214 | * | 1/1993 |
| JP | 8-250370 | * | 9/1996 |
| JP | 9-221508 | * | 8/1997 |
| JP | B2-3190177 | | 5/2001 |
| JP | 2004-291455 | * | 10/2004 |
| WO | 88/07505 | * | 10/1988 |

OTHER PUBLICATIONS

T. Chartier et al., "Tape Casting Using UV Curable Binders," Journal of the European Ceramic Society, vol. 17, pp. 765-771 (1997).*

* cited by examiner

PRODUCTION METHOD OF MULTILAYER ELECTRONIC DEVICE

BACKGROUND OF THE INVENTION

1. Field of the Invention

The present invention relates to a production method of a multilayer electronic device, such as a multilayer ceramic capacitor, and particularly relates to a production method of a multilayer electronic device, by which so-called a sheet attack phenomenon does not arise when forming an electrode pattern layer on a green sheet surface, consequently, a resultant electronic device has a low short-circuiting defective rate.

2. Description of the Related Art

As a method of producing a multilayer electronic device, such as a capacitor, piezoelectric element, PTC thermister, NTC thermister and varistor, for example, a method described below is known. Namely, ceramic slurry including a ceramic powder, organic binder, plasticizer and solvent, etc. is formed to be a sheet shape on a flexible supporting body (for example, a PET film) by the doctor blade method, etc. so as to obtain a green sheet first. A paste including an electrode material, such as palladium, silver and nickel, is printed in a predetermined pattern on the green sheet so as to obtain an electrode pattern layer.

When obtaining a multilayer structure, the obtained green sheets are stacked to obtain a desired multilayer structure and subjected to press cutting processing to be a ceramic green chip. A binder in the thus obtained ceramic green chip is burnt out, fired at 1000° C. to 1400° C., and a terminal electrode made by silver, silver-palladium, nickel or copper, etc. is formed on an obtained fired body, so that a ceramic multilayer electronic device is obtained.

When producing, for example, a multilayer ceramic capacitor by the above production method, a method of making a thickness of one dielectric layer thinner and increasing the number of stacked layers can be considered as a method of attaining a more compact body with a larger capacity. However, in the method of releasing a green sheet from a flexible supporting body and stacking, it is hard to release the green sheet from the flexible supporting body and the yield of stacking becomes very poor particularly in the case of a thin green sheet. Also, it is necessary to handle thin green sheets, characteristic defectives, such as short-circuiting, often occur in completed products.

As a method of solving such disadvantages, a method of obtaining a multilayer body by repeating a step of forming a green sheet and a step of printing an electrode on the green sheet (sheet coating and printing) exactly for the times of necessary number of layers to be stacked on a flexible supporting body may be considered. Due to this, releasing of the sheet from the supporting body becomes easier by an increased amount of the total thickness of the sheet (the patent article 1, etc. below).

However, this production method of the related art has problems as described below. The first disadvantageous point is that a step of printing an electrode pattern on a dried green sheet as a first layer is a Wet-on-Dry method. Namely, corrosion of a sheet portion of the first layer (sheet attack by a solvent) is caused by a solvent used when printing the electrode, so that a thickness of a sheet portion under an electrode printed portion becomes thin and short-circuiting easily occurs.

The second point is that when coating a sheet (wet-on Dry method) as a second layer (the case of the second layer is considered as an example), slurry to be coated as a second layer is soaked in the dried sheet portion of the first layer. As a result, disadvantages that sheet thicknesses become different between the first layer and the second layer, pinholes and other defective arise and the production characteristics are adversely affected.

The third point is that a step of printing an electrode after coating the second sheet and on (the case of the second layer is considered as an example) becomes a Wet-on-Dry method, so that a sheet portion of the second layer is corroded by a solvent used when printing the electrode. Therefore, a thickness of the sheet portion under the electrode printed portion becomes thin and short-circuiting is easily caused.

Particularly, when a sheet thickness of one layer is 3 µm or thinner and particularly when 1 µm or thinner, these disadvantages become notable and a compact multilayer ceramic capacitor having a large capacity becomes difficult.

[Patent Article 1] The Japanese Patent Publication No. 3190177

SUMMARY OF THE INVENTION

The present invention is made in consideration with the above circumstances, an object of the present invention is to provide a production method of a multilayer electronic device, by which a so-called sheet attack phenomenon does not arise when forming an electrode pattern layer on a green sheet surface and a short-circuiting defective rate of a resultant electronic device is low.

To attain the above object, according to the present invention, there is provided a production method of a multilayer electronic device, comprising the steps of:

forming a lower side green sheet including at least a ceramic powder on a supporting body;

forming an electrode pattern layer on a surface of the lower side green sheet;

forming a green chip by stacking multilayer units including at least the lower side green sheet and an electrode pattern layer; and firing the green chip;

wherein the lower side green sheet formed on the supporting body includes a binder of a curable resin, and the curable resin in the lower side green sheet is cured before forming the electrode pattern layer on the lower side green sheet.

In the method according to the present invention, the curable resin included in the lower side green sheet is cured by applying heat, an ultraviolet ray or an electron beam, etc. before forming an electrode pattern layer on the surface of the lower side green sheet as a first layer. The cured resin is changed to be a resin, which is insoluble to any solvent. Therefore, even when an electrode pattern layer is formed on the surface of the lower side green sheet by the printing method, etc., a solvent included in the electrode pattern layer does not corrode the green sheet (sheet attack by the solvent does not occur). As a result, short-circuiting defectives can be reduced in a resultant electronic device.

Preferably, the production method according to the present invention further comprises the steps of:

forming an intermediate green sheet including a binder of a curable resin on an electrode pattern layer after forming the electrode pattern layer on the lower side green sheet;

curing the curable resin in the intermediate green sheet after that; and forming an electrode pattern layer on the intermediate green sheet after that;

wherein:

two or more the electrode pattern layers are formed via one or more the intermediate green sheet on the supporting sheet;

an upper side green sheet is formed on an electrode pattern layer positioned on top;

the multilayer unit is composed of the lower side green sheet, one or more the intermediate green sheet, two or more the electrode pattern layers and the upper side sheet; and the upper side green sheet includes a binder of a thermoplastic resin.

The multilayer units are stacked (a lamination pressing process) in a later step, by which a lower side green sheet is arranged on an upper side green sheet by contact. The lower side green sheet includes a curable resin, and the resin is already cured. When assuming that the upper side green sheet also includes a cured curable resin, it is liable that bonding of the two becomes insufficient and preferable stacking cannot be attained. In the present embodiment, the upper side green sheet includes a binder containing a thermoplastic resin, so that when a lower side green sheet of another multilayer unit is stacked on the upper side green sheet, the adhesiveness is preferable and stacking becomes easy.

Also, even if the upper side green sheet is formed by slurry including a thermoplastic resin, since the intermediate green sheet is cured, the slurry does not soak in the intermediate green sheet. Therefore, disadvantages of uneven sheet thicknesses and pinholes, etc. are hard to arise. Note that due to the same reason, when forming an intermediate green sheet, the slurry does not soak in the lower side green sheet because the lower side green sheet is cured. Therefore, disadvantages that sheet thickness becomes uneven and pinholes, etc. hardly arise.

Also preferably, the production method according to the present invention, further comprises the steps of:

forming an intermediate green sheet including a binder of a curable resin on an electrode pattern layer after forming the electrode pattern layer on the lower side green sheet;

curing the curable resin in the intermediate green sheet after that; and forming an electrode pattern layer on the intermediate green sheet after that;

wherein:

two or more the electrode pattern layers are formed via one or more the intermediate green sheet on the supporting sheet;

an upper side green sheet is formed on an electrode pattern layer positioned on top;

the multilayer unit is composed of the lower side green sheet, one or more the intermediate green sheet, two or more the electrode pattern layers and the upper side green sheet; and the upper side green sheet includes a binder of a curable resin, which is not cured to give adhesiveness to the sheet.

The lower side green sheet includes a curable resin, and the resin is already cured. When assuming that the upper side green sheet also includes a cured curable resin, it is liable that bonding of the two becomes insufficient and preferable stacking cannot be attained. In the present embodiment, the curable resin in the upper side green sheet is not cured, so that when a lower side green sheet of another multilayer unit is stacked on the upper side green sheet, the adhesiveness is preferable and stacking becomes easy.

Furthermore preferably, a binder of a curable resin included in the upper side green sheet is the same kind as that included in the lower side green sheet and the intermediate green sheet.

As a result that the binder of a curable resin included in the upper side green sheet and that included in the lower side green sheet and the intermediate green sheet are the same kind, the same slurry can be used and kinds of pastes can be reduced.

In the present invention, preferably, a thickness of the intermediate green sheet is approximately equal to a sum of a thickness of the lower side green sheet and a thickness of the upper side green sheet. A lower side green sheet of another multilayer unit is stacked by contact on the upper side green sheet. Therefore, to equalize thicknesses of green sheets existing between electrode pattern layers in the stacking direction after stacking, it is preferable that a thickness of the intermediate green sheet is approximately equal to a sum of a thickness of the lower side green sheet and a thickness of the upper side green sheet.

When a thickness of the lower side green sheet is made thin as 3 μm or thinner, 2 μm or thinner, and furthermore, 1 μm or thinner, short-circuiting defectives are particularly easily caused due to a sheet attack phenomenon. In the present invention, the lower side green sheet and the intermediate green sheet include a curable resin and sheet attack hardly arises as explained above, so that short-circuiting defective hardly arises even in the case of a thin green sheet.

Preferably, the step of forming a blank pattern layer on blank portions not formed with the electrode pattern layer on the green sheet before forming the intermediate green sheet or the upper side green sheet on the electrode pattern layer is furthermore included. Note that in the present invention, the blank pattern layer is a pattern having a mutually compensating relationship with an electrode pattern. By forming the blank pattern layer, a level difference is not formed on a green sheet even when the green sheet is formed on an electrode pattern layer, so that a chip shape after stacking becomes also preferable.

Note that when forming the blank pattern layer, a resin included in a green sheet on a lower side thereof is cured, it is hardly affected by sheet attack by a solvent of a printing paste for forming the blank pattern layer, and effects of preventing short-circuiting defects can be obtained.

According to the present invention, there is provided a preferable production method, comprising the steps of:

forming a lower side green sheet including at least a ceramic powder and a binder of a curable resin on a supporting body;

curing the curable resin included in the lower side green sheet;

forming an electrode pattern layer on a surface of the lower side green sheet;

forming an intermediate green sheet including at least a ceramic powder and a binder of a curable resin on the electrode pattern layer;

curing the curable resin in the intermediate green sheet; and forming an electrode pattern layer on the intermediate green sheet;

wherein:

two or more the electrode pattern layers are formed on the supporting body via one or more the intermediate green sheet;

an upper side green sheet including at least a ceramic powder and a binder of a thermoplastic resin is formed on an electrode pattern layer positioned on top;

a multilayer unit composed of single the lower side green sheet, one or more but not more than 50 layers of the intermediate green sheet, two or more but not more than 51 layers of the electrode pattern layers and single the upper side green sheet is formed on the supporting body; and two or more the multilayer units released from the supporting body are stacked, so that the lower side green sheet contacts the upper side green sheet, to form a green chip and, then, the green chip is fired.

According to the present invention, there is provided a preferable production method, comprising the steps of:

forming a lower side green sheet including at least a ceramic powder and a binder of a curable resin on a supporting body;

curing the curable resin included in the lower side green sheet;

forming an electrode pattern layer on a surface of the lower side green sheet;

forming an intermediate green sheet including at least a ceramic powder and a binder of a curable resin on the electrode pattern layer;

curing the curable resin in the intermediate green sheet; and forming an electrode pattern layer on the intermediate green sheet;

wherein:

two or more the electrode pattern layers are formed on the supporting body via one or more the intermediate green sheet;

an upper side green sheet including at least a ceramic powder and a binder of a curable resin is formed on an electrode pattern layer positioned on top;

a multilayer unit composed of single the lower side green sheet, one or more but not more than 50 layers of the intermediate green sheet, two or more but not more than 51 layers of the electrode pattern layers and single the upper side green sheet is formed on the supporting body; and without curing the curable resin in the upper side green sheet, two or more the multilayer units released from the supporting body are stacked, so that the lower side green sheet contacts the upper side green sheet, to form a green chip and, then, the green chip is fired.

The curable resin is not particularly limited and is, for example, any one of a thermosetting resin, an ultraviolet ray curable resin and an electron beam curable resin. The thermosetting resin is cured by heated, the ultraviolet ray curable resin is cured by being irradiated with an ultraviolet ray, and the electron beam curable resin is cured by being irradiated with an electron beam. In the present invention, resins easily subjected to binder removal processing in a later step are preferable among them and, for example, thermosetting acrylic resins, ultraviolet ray curing acrylic resins, and electron beam curing acrylic resins, etc. are preferable.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

First, as an embodiment of an electronic device produced by a method according to the present invention, an overall configuration of a multilayer ceramic capacitor will be explained.

Figure 1:
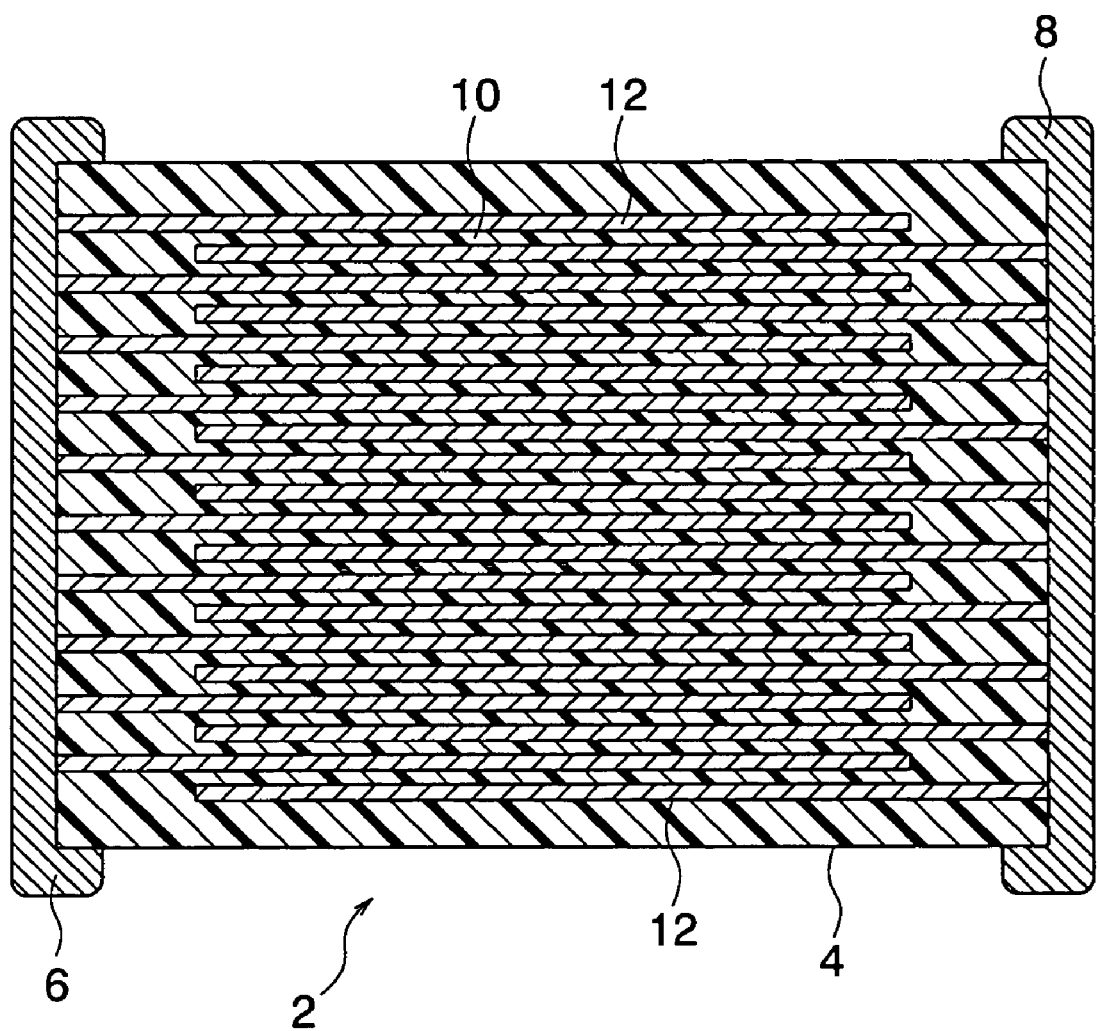
FIG. 1 is a schematic sectional view of a multilayer ceramic capacitor according to an embodiment of the present invention.

As shown in FIG. 1, a multilayer ceramic capacitor 2 according to the present embodiment comprises a capacitor element 4, a first terminal electrode 6 and a second terminal electrode 8. The capacitor element 4 comprises dielectric layers 10 and internal electrode layers 12, and the internal electrode layers 12 are stacked alternately between the dielectric layers 10. One side of the alternately stacked internal electrodes layers 12 is electrically connected to inside of the first terminal electrode 6 formed outside of the first end portion of the capacitor element 4. Also, the other side of the alternately stacked internal electrode layers 12 is electrically connected to inside of the second terminal electrode 8 formed outside of the second end portion of the capacitor element 4.

A material of the dielectric layer 10 is not particularly limited and may be a dielectric material, such as calcium titanate, strontium titanate and/or barium titanate. A thickness of each dielectric layer 10 is not particularly limited and is generally several μm to several hundreds of μm. Particularly in the present embodiment, it is made as thin as preferably 3 μm or thinner, more preferably 1.5 μm or thinner, and particularly preferably 1 μm or thinner.

A material of the terminal electrodes 6 and 8 is not particularly limited either, and copper, a copper alloy, nickel and a nickel alloy, etc. are normally used or silver and an alloy of silver and palladium, etc. may be also used. A thickness of the terminal electrodes 6 and 8 is not particularly limited and is normally 10 to 50 μm or so.

A shape and size of the multilayer ceramic capacitor 2 may be suitably determined in accordance with the object and use. When the multilayer ceramic capacitor 2 has a rectangular parallelepiped shape, the size is normally a length (0.6 to 5.6 mm, preferably 0.6 to 3.2 mm)×a width (0.3 to 5.0 mm, particularly 0.3 to 1.6 mm)×a thickness (0.1 to 1.9 mm, preferably 0.3 to 1.6 mm) or so.

Next, an example of a production method of the multilayer ceramic capacitor 2 according to the present embodiment will be explained.

Figure 2:
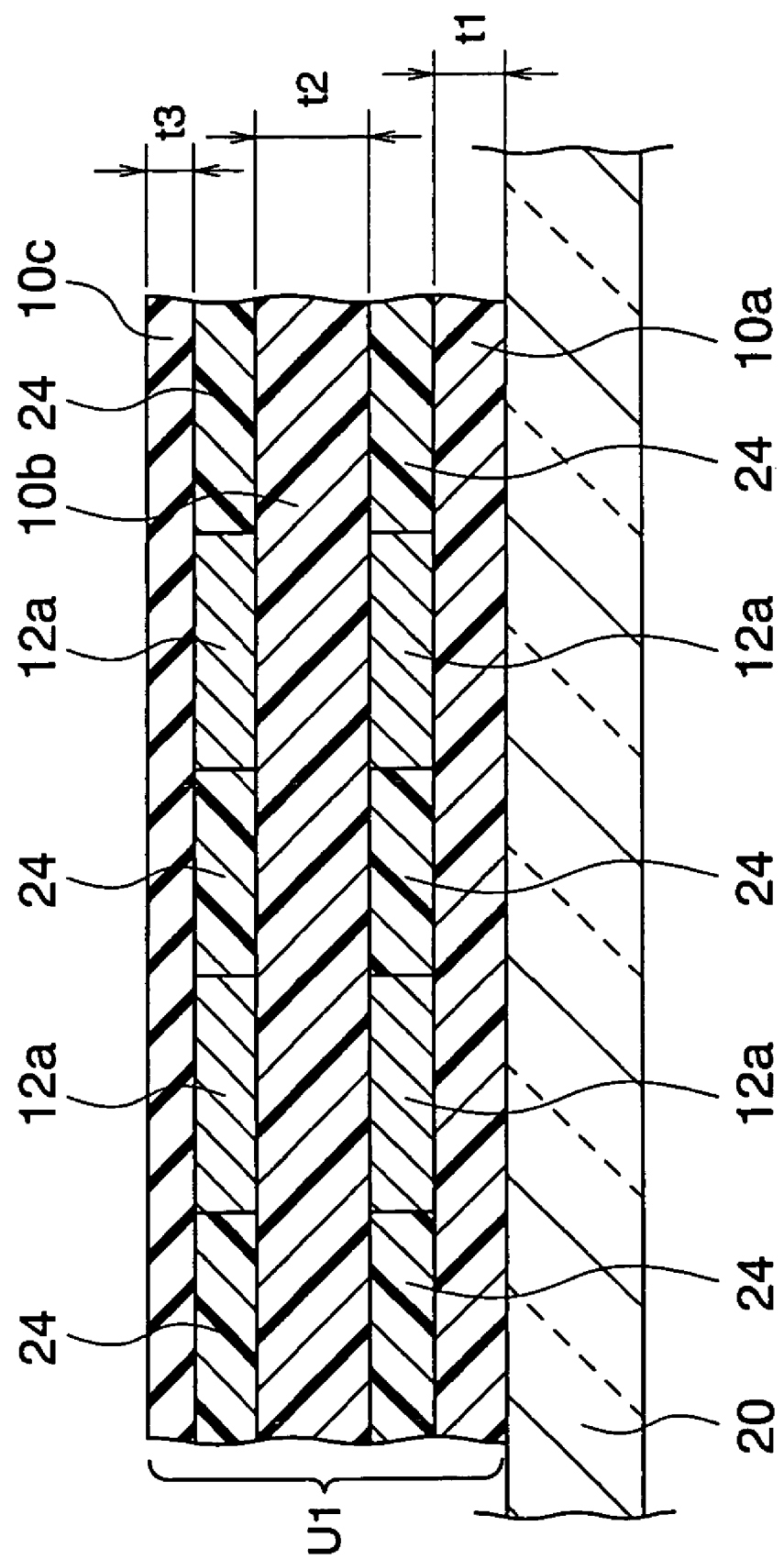
FIG. 2 is a sectional view of a key part showing a first production process of a production method of the multilayer ceramic capacitor shown in FIG. 1.

First, as shown in FIG. 2, a lower side green sheet 10*a* is formed to be a thickness of t1 on a carrier sheet 20 as a supporting sheet (supporting body) by a nozzle coating method or doctor blade method, etc. The lower side green sheet 10*a* is dried after being formed on the carrier sheet 20. A drying temperature of the lower side green sheet 10*a* is preferably 50 to 100° C., and the drying time is preferably 1 to 20 minutes. A thickness of the dried green sheet 10*a* is shrunk to 5 to 25% of a thickness before drying. The thickness t1 of the dried green sheet is preferably 1.5 μm or thinner, more preferably 1.0 μm or thinner, and particularly preferably 0.5 μm or thinner.

As the carrier sheet 20, for example, a PET film, etc. is used, and it is preferable that silicon, etc. is coated to improve releasability. A thickness of the carrier sheet 20 is not particularly limited, but preferably 5 to 100 μm.

In the present embodiment, a dielectric paste for forming the lower side green sheet 10a is normally composed of an organic solvent based paste obtained by kneading a dielectric material and an organic vehicle or a water based paste.

The dielectric material is suitably selected from a variety of compounds to be composite oxides or oxides, such as carbonates, nitrates, hydroxides, and organic metal compounds, etc. and mixed for use. The dielectric material in a form of powder having an average particle diameter of 0.3 μm or smaller, and preferably 0.2 μm or smaller is normally used. Note that it is desired to use finer powder than a green sheet thickness to form an extremely thin green sheet.

An organic vehicle is obtained by dissolving a binder in an organic solvent. As the binder to be used for the organic vehicle, a curable resin is used in the present embodiment. A curable resin is a resin to be cured due to energy of some kind and, for example, thermosetting resins, ultraviolet (UV) curable resins, electron beam curable resins and two pack type polymerization type, etc. may be mentioned.

As a preferable thermosetting resin, a thermosetting acrylic resin, thermosetting epoxy resin, thermosetting urethane acrylate, thermosetting polyester acrylate, thermosetting urethane resin, thermosetting urea resin and thermosetting melanin resin, etc. may be mentioned. Also, as a preferable UV curable resin, a UV curing acrylic resin, UV curing urethane acrylate, UV curing polyester acrylate, UV setting urethane resin, UV curing epoxy acrylate and UV curing imide acrylate, etc. may be mentioned. Furthermore, as a preferable electron beam curable resin, an electron beam curing acrylic resin, electron beam curing urethane acrylate, electron beam curing polyester acrylate, electron beam curing urethane resin, electron beam curing epoxy acrylate resin and cation curing type resin, etc. may be mentioned.

An organic solvent to be used for the organic vehicle is not particularly limited as far as the above binder resin is dissolved therein, and terpineol, alcohol, butylcarbitol, acetone, methylethyl ketone (MEK), toluene, xylene, ethyl acetate, butyl strarate, isobornyl acetate and other organic solvent may be used. A content of each component in the dielectric paste is not particularly limited and may be a normal content of, for example, 5 to 10 wt % or so of a binder and 10 to 50 wt % or so of a solvent.

The dielectric paste may include additives selected from a variety of dispersants, plasticizers, dielectrics, glass flits, insulators and antistatic agents, etc. in accordance with need. Note that a total content thereof is preferably 10 wt % or smaller. As a plasticizer, dioctyl phthalate, benzylbutyl phthalate and other phthalate esters, adipic acids, phosphorous esters and glycols, etc. may be mentioned.

When using an acrylic resin as a binder resin, a content of a plasticizer is preferably 25 to 100 parts by weight with respect to 100 parts by weight of the binder resin. When the plasticizer is too little, the green sheet tends to be brittle, while when too much, the plasticizer exudes and the handlability declines.

After forming the lower side green sheet 10a on the carrier sheet 20 and drying, the curable resin included in the lower side green sheet 10a is cured by applying energy in accordance with the characteristics of the curable resin. For example, heat is applied for curing in the case of a thermosetting resin, an ultraviolet ray is irradiated for curing in the case of a UV curable resin, and an electron beams is irradiated for curing in the case of an electronic beam curable resin.

Next, as shown in FIG. 2, on a surface of the lower side green sheet 10a formed on the carrier sheet 20, an electrode pattern layer 12a having a predetermined pattern is formed and, next to that, a blank pattern layer 24 having substantially the same thickness as that of the electrode pattern layer 12a is formed on the surface of the lower side green sheet 10a not formed with the electrode pattern layer 12a. A thickness of the electrode pattern layer 12a after drying is not particularly limited, but is 30 to 80% of the thickness t1 of the lower side green sheet 10a after drying.

The electrode pattern layer 12a can be formed on the surface of the green sheet 10a, for example, by a thick film formation method, such as a printing method using an electronic paste, or a thin film formation method, such as an evaporation method and sputtering. Formation of an electrode pattern layer 12a on the surface of the green sheet 10a by the screen printing method or a gravure printing method as kinds of thick film formation methods is as below.

First, an electrode paste is prepared. An electrode paste is fabricated by kneading a dielectric material composed of a variety of conductive metals and alloys or a variety of oxides to be the conductive materials explained above after firing, an organic metal compound or resinate, etc. and an organic vehicle.

As a conductive material to be used when producing the electrode paste, Ni, a Ni alloy and a mixture of these are used. A shape of the conductive materials is not particularly limited and may be a spherical shape and scale-like shape, etc. or a mixture of these shapes. Those having an average particle diameter of the conductive material of normally 0.1 to 2 μm, and preferably 0.2 to 1 μm or so may be used.

An organic vehicle contains a binder and a solvent. As the binder, for example, ethyl cellulose, an acrylic resin, polyvinyl butyral, polyvinyl acetal, polyvinyl alcohol, polyolefin, polyurethane, polystyrene, or a copolymer of these may be mentioned. Among them, butyrals, such as ethyl cellulose and polyvinyl butyral, are preferable.

The binder is contained in the electrode paste by preferably 4 to 20 parts by weight with respect to 100 parts by weight of the conductive material (metal powder). As a solvent, any of well-known ones, such as terpineol, butylcarbitol, kerosene, acetone and isobornyl acetate may be used. A content of the solvent is preferably 20 to 55 wt % or so with respect to the entire paste.

To improve the adhesiveness, the electrode paste preferably includes a plasticizer or an adhesive agent. As a plasticizer, ones as same as those in the dielectric paste may be used, and an adding quantity of the plasticizer in the electrode paste is preferably 10 to 300 parts by weight, and more preferably 10 to 200 parts by weight with respect to 100 parts by weight of the binder. Note that when the adding quantity of the plasticizer or adhesive agent is too much, strength of the electrode pattern layer 12a tends to decline remarkably. Also, it is preferable that a plasticizer and/or adhesive agent is added to the electrode paste to improve the adhesiveness and/or adherence.

After or before forming an electrode paste layer having a predetermined pattern on the surface of the green sheet 10a by the printing method, a blank pattern layer 24 having substantially the same thickness as that of the electrode layer 12a is formed on the surface of the green sheet 10a not formed with the electrode layer 12a. The blank pattern layer 24 is formed by using the same dielectric paste as that of the lower side green sheet by the printing method, but as a binder resin included in the dielectric paste for the blank pattern layer, a normal thermoplastic resin not including a curable resin may be used.

Namely, the dielectric paste for forming the blank pattern layer 24 may include a thermoplastic resin as a binder resin in the same way as a later explained dielectric paste for forming an upper side green sheet 10c. In terms of improving adhesiveness at the time of stacking, the dielectric paste for forming the blank pattern layer 24 preferably includes a thermoplastic resin as a binder resin in the same way as the dielectric paste for forming the upper side green sheet 10c.

The blank pattern layer 24 is formed by the printing method, etc. in the same way as forming the electrode pattern layer 12a. The electrode layer 12a and the blank pattern layer 24 are dried in accordance with need. The drying temperature is not particularly limited and is preferably 70 to 120° C., and the drying time is preferably 5 to 15 minutes.

Next, on the electrode pattern layer 12a and blank pattern layer 24, as shown in FIG. 2, an intermediate green sheet 10b is formed by the doctor blade method or nozzle coating method, etc. A dielectric paste for forming the intermediate green sheet 10b includes a curable resin as a binder resin in the same way as in the dielectric paste for forming the lower side green sheet 10a.

It is preferable that the dielectric paste for forming the intermediate green sheet 10b and the dielectric paste for forming the lower side green sheet 10a are exactly the same in terms of reducing kinds of pastes, but they do not have to be always the same. For example, kinds of the curable resin may be different in the dielectric paste for forming the intermediate green sheet 10b and that for forming the lower side green sheet 10a. Note that kinds of energy for curing them may be also different in that case.

After forming the intermediate green sheet 10b, it is dried and, then, energy is applied to a curable resin included in the intermediate green sheet 10b for curing the resin. A method of curing is the same as that in the lower side green sheet 10a. A thickness t2 of the intermediate green sheet 10b after drying will be explained later on.

Next, an electrode pattern layer 12a as a second layer and a blank pattern layer 24 are formed on a surface of the intermediate green sheet 10b by the same method as that of forming the electrode pattern layer 12a as the first layer and the blank pattern layer 24.

Next, an upper side green sheet 10c is formed on the electrode pattern layer 12a as the second layer and the blank pattern layer 24. The upper side green sheet 10c is formed by the doctor blade method or nozzle coating method, etc. A dielectric paste for the upper side green sheet 10c is composed of a paste including as a binder resin a normal thermoplastic resin or a curable resin before curing.

Namely, the dielectric paste is composed of an organic solvent based paste obtained by kneading a dielectric material and an organic vehicle or a water based paste.

The dielectric material is suitably selected from a variety of compounds to be composite oxides or oxides, such as carbonates, nitrates, hydroxides, and organic metal compounds, etc. and mixed for use. The dielectric material in a form of powder having an average particle diameter of 0.3 μm or smaller, and preferably 0.2 μm or smaller is normally used. Note that it is desired that finer powder than a green sheet thickness is used to form an extremely thin green sheet.

An organic vehicle is obtained by dissolving a binder in an organic solvent. As the binder to be used for the organic vehicle, a curable resin yet to be cured or a thermoplastic resin is used in the present embodiment. The curable resin yet to be cured or thermoplastic resin is composed of, for example, an acrylic resin, polyvinyl butyral and other butyral resin, polyvinyl acetal, polyvinyl alcohol, polyolefin, polyurethane, polystyrene or organics composed of copolymers of these or emulsion. In the present embodiment, it is particularly preferable to use an acrylic resin or polyvinyl butyral and other butyral based resin as the thermoplastic resin.

Also, an organic solvent to be used for the organic vehicle is not particularly limited and terpineol, alcohol, butylcarbitol, acetone, methylethyl ketone (MEK), toluene, xylene, ethyl acetate, butyl strarate, isobornyl acetate and other organic solvent may be used. A vehicle in the water based paste is obtained by dissolving a water-soluble binder in water. The water-soluble binder is not particularly limited and polyvinyl alcohol, methyl cellulose, hydroxylethyl cellulose, water-soluble acrylic resin and emulsion, etc. may be used. A content of each component in the dielectric paste is not particularly limited and may be a normal content of, for example, 5 to 10 wt % or so of a binder and 10 to 50 wt % or so of a solvent.

The dielectric paste may include additives selected from a variety of dispersants, plasticizers, dielectrics, glass flits, insulators and antistatic agents, etc. in accordance with need. Note that a total content thereof is preferably 10 wt % or smaller. As a plasticizer, dioctyl phthalate, benzylbutyl phthalate and other phthalate esters, adipic acids, phosphorous esters and glycols, etc. may be mentioned. When using a butyral based resin as a binder resin, a content of a plasticizer is preferably 25 to 100 parts by weight with respect to 100 parts by weight of the binder resin. When the plasticizer is too little, the green sheet tends to be brittle, while when too much, the plasticizer exudes and the handlability declines.

The upper side green sheet 10c formed by using the dielectric paste is dried after forming. A drying condition of the upper side green sheet 10c is the same as that in the lower side green sheet 10a. Note that the upper side green sheet 10c is different from the lower side green sheet 10a in a point that processing for curing a curable resin is not performed after drying.

In the present embodiment, the lower side green sheet 10a, the electrode pattern layer 12a (including the blank pattern layer 24) as a first layer, the intermediate green sheet 10b, the electrode pattern layer 12a (including the blank pattern layer 24) as a second layer and the upper side green sheet 10c compose a single multilayer unit U1. The multilayer unit U1 will be stacked by a large number as shown in FIG. 3 in a later step.

A thickness t3 of the upper side green sheet 10c after drying is preferably determined, for example, as below. Namely, it is preferable that the thickness t3 is determined to be approximately equal to a value obtained by subtracting the thickness t1 of the lower side green sheet 10a from the thickness t2 of the intermediate green sheet 10b. Namely, it is preferable that the relationship of t2=t1+t3 is satisfied. Also, it is preferable that the thickness t3 is approximately the same as the thickness t1. For example, when t2=1 μm or so, it is preferable that t1=t3=0.5 μm or so is satisfied.

Figure 3:
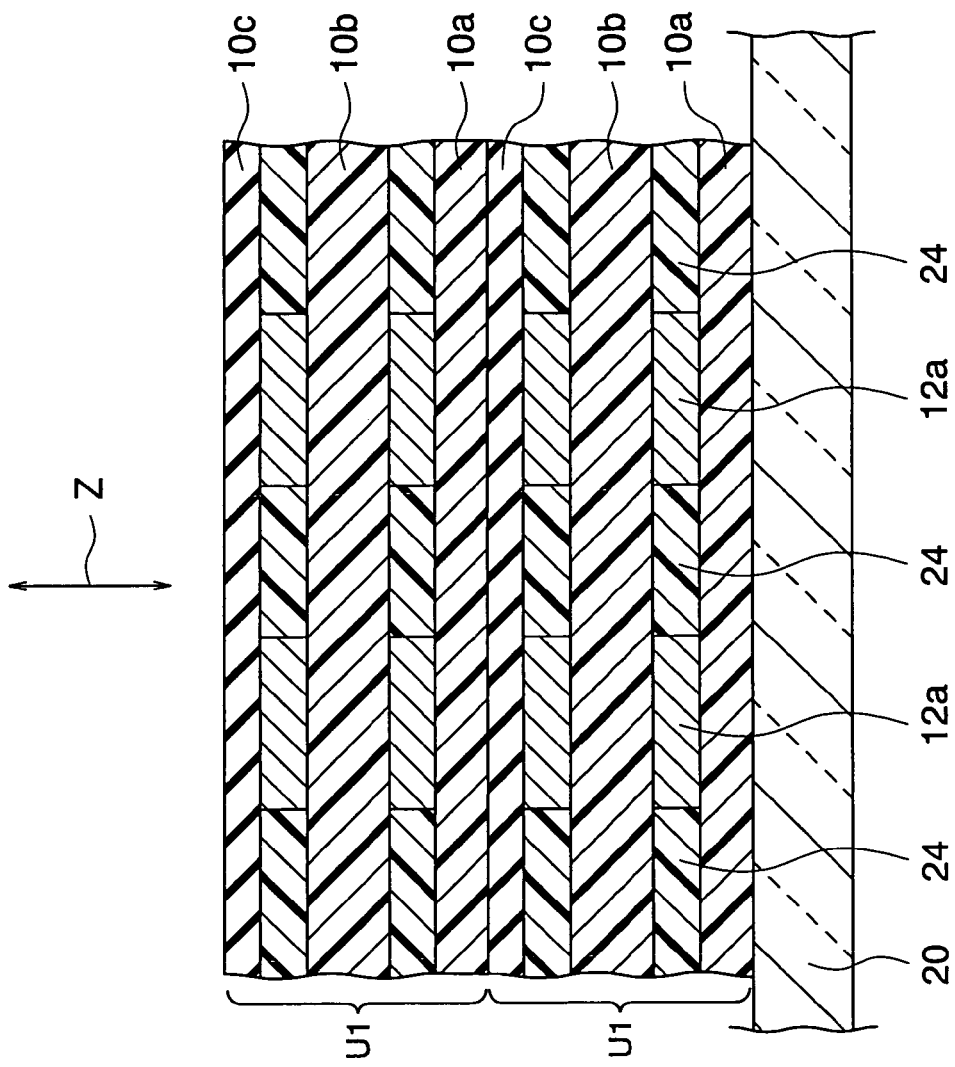
FIG. 3 is a sectional view of a key part showing a step continued from FIG. 2.

As shown in FIG. 3, the multilayer unit U1 released from the carrier sheet 20 is stacked on another multilayer unit U1 stacked on the carrier sheet 20, so that the upper side green sheet 10c contacts the lower side green sheet 10a. By repeating the stacking of the multilayer unit U1, a multilayer body, wherein a large number of electrode pattern layers 12a are stacked in the stacking direction Z, is obtained. Note that when the upper side green sheet 10c includes a curable resin yet to be cured, curing processing of the upper side green sheet 10c is not performed to stack the multilayer units U1.

Between adjacent electrode pattern layers 12a in the stacking direction Z, an intermediate green sheet 10b or stacked green sheets of an upper side green sheet 10c and a lower side green sheet 10a are provided. In the present embodiment, by satisfying t2=t1+t3, intervals between adjacent electrode pattern layers 12a in the stacking direction Z can become approximately constant. The thickness t1 and the thickness t3 do not have to be always the same, but when one of them is made too thick, the other becomes thin and formation of a thin layer tends to become difficult.

In the present embodiment, a large number of the multilayer units U1 are stacked in the stacking direction Z, the stacked body is cut to a predetermined size after final pressing, so that a green chip is formed. Note that, while not illustrated, an exterior green sheet not formed with an electrode pattern layer is stacked on each of the stacking end portions in the stacking direction Z of the multilayer units U1. Note that a pressure at the final pressing is preferably 10 to 200 MPa, and the heating temperature is preferably 40 to 100° C.

In the present embodiment, the electrode pattern layers 12a become internal electrode layers 12 after firing, and the intermediate green sheets 10b or the stacked sheets of the upper side green sheets 10c and lower side green sheets 10a become dielectric layers 10 after firing in the green chip obtained by cutting the multilayer body.

After that, the green chip is subjected to binder removal processing and firing processing, then, thermal treatment is performed for re-oxidizing the dielectric layers.

The binder removal processing may be performed under a normal condition, but when using a base metal, such as Ni and a Ni alloy, as a conductive material of the internal electrode layer, it is preferably performed under the specific condition below.

temperature rising rate: 5 to 300° C./hour, particularly 10 to 50° C./hour holding temperature: 200 to 400° C., particularly 250 to 350° C.

holding time: 0.5 to 20 hours, particularly 1 to 10 hours atmosphere: a wet mixed gas of $N_2$ and $H_2$ A firing condition is preferably as below.

temperature rising rate: 50 to 500° C./hour, particularly 200 to 300° C./hour holding temperature: 1100 to 1300° C., particularly 1150 to 1250° C.

holding time: 0.5 to 8 hours, particularly 1 to 3 hours cooling rate: 50 to 500° C./hour, particularly 200 to 300° C./hour atmosphere gas: a wet mixed gas of $N_2$ and $H_2$, etc.

Note that oxygen partial pressure in an atmosphere in the air at firing is preferably $10^{-2}$ Pa or lower, particularly $10^{-2}$ to $10^{-8}$ Pa. When exceeding the above ranges, the internal electrode layer tends to oxidize, while when the oxygen partial pressure is too low, abnormal sintering is caused in an electrode material of the internal electrode layer to be broken.

The thermal treatment after performing such firing is preferably performed with a holding temperature or highest temperature of 1000° C. or higher, more preferably 1000 to 1100° C. Oxygen partial pressure at the thermal treatment is higher than that in the reducing atmosphere at firing and is preferably $10^{-3}$ Pa to 1 Pa, and more preferably $10^{-2}$ Pa to 1 Pa.

Other condition of the thermal treatment is preferably as below.

holding temperature: 0 to 6 hours, particularly 2 to 5 hours cooling rate: 50 to 500° C./hours, particularly 100 to 300° C./hour atmosphere gas: wet $N_2$ gas, etc.

Note that to wet the $N_2$ gas and mixed gas, etc., an apparatus for bubbling, for example, by letting a gas into warmed water, etc. may be used. In this case, the water temperature is preferably 0 to 75° C. The binder removal processing, firing and thermal treatment may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment. On the other hand, when performing them separately, after raising the temperature to the holding temperature at the binder removal processing in an atmosphere of a $N_2$ gas or a wet $N_2$ gas, the atmosphere is changed, and the temperature is furthermore raised. After that, after cooling the temperature to the holding temperature at the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode paste is burnt to form terminal electrodes 6 and 8. For example, a firing condition of the terminal electrode paste is preferably at 600 to 800° C. for 10 minutes to 1 hour or so in a wet mixed gas of $N_2$ and $H_2$. In accordance with need, soldering, etc. is performed on the terminal electrodes 6 and 8 to form a pad layer. Note that the terminal electrode paste may be fabricated in the same way as the electrode paste explained above.

A multilayer ceramic capacitor of the present invention produced as above is mounted on a print substrate, etc. by soldering, etc. and used for a variety of electronic equipments, etc.

In the present embodiment, before forming an electrode pattern layer 12a on a surface of the lower side green sheet 10a as the first layer, a curable resin included in the lower side green sheet 10a is cured by applying heat, ultraviolet ray or electron beam, etc. The cured resin is changed to be a resin, which is insoluble to any solvent. Therefore, even when an electrode pattern layer 12a is formed on the surface of the lower side green sheet 10a by the printing method, etc., a solvent included in the electrode pattern layer 12a does not corrode the green sheet (sheet attack by the solvent does not occur). As a result, short-circuiting defectives can be reduced in a resultant multilayer ceramic capacitor 2.

Also, in the present embodiment, the multilayer units U1 are stacked (a lamination pressing process) as shown in FIG. 3, by which a lower side green sheet 10a is arranged on an upper side green sheet 10c by contact. The lower side green sheet 10a includes a curable resin, and the resin of the lower side green sheet 10a is already cured. When assuming that the upper side green sheet 10a also includes a cured resin, it is liable that bonding of the two becomes insufficient and preferable stacking cannot be attained. In the present embodiment, on the upper side green sheet 10c, an upper side green sheet including at least a ceramic powder and a not cured curable resin or an upper side green sheet including at least a thermoplastic resin is formed, so that when a lower side green sheet 10*a* of another multilayer unit U1 is stacked on the upper side green sheet 10*c*, the adhesiveness is preferable and stacking becomes easy.

Also, even if the upper side green sheet 10*c* includes a not cured curable resin or is formed by slurry including a thermoplastic resin, since the intermediate green sheet 10*b* is cured, the slurry does not soak in the intermediate green sheet 10*b*. Therefore, disadvantages of uneven sheet thicknesses and pinholes, etc. hardly arise. Note that since the lower side green sheet 10*a* is cured, the slurry does not soak in the lower side green sheet 10*a* when the intermediate green sheet 10*b* is made, because of the same reason. Therefore, disadvantages of uneven sheet thicknesses and pinholes, etc. hardly arise.

Consequently, according to the production method of the present embodiment, sheet attack can be effectively prevented and high adhesiveness can be maintained while stacking even when the green sheet is made extremely thin. Furthermore, since multilayer units U1 having at least two electrode pattern layers 12*a* are stacked in the stacking direction, the stacking step is shortened, so that the production steps can be simplified and the production cost can be reduced.

Note that the present invention is not limited to the above embodiment and may be variously modified within the scope of the present invention.

For example, the method of the present invention is not limited to a production method of a multilayer ceramic capacitor and may be applied for producing other multilayer electronic devices.

Figure 4:
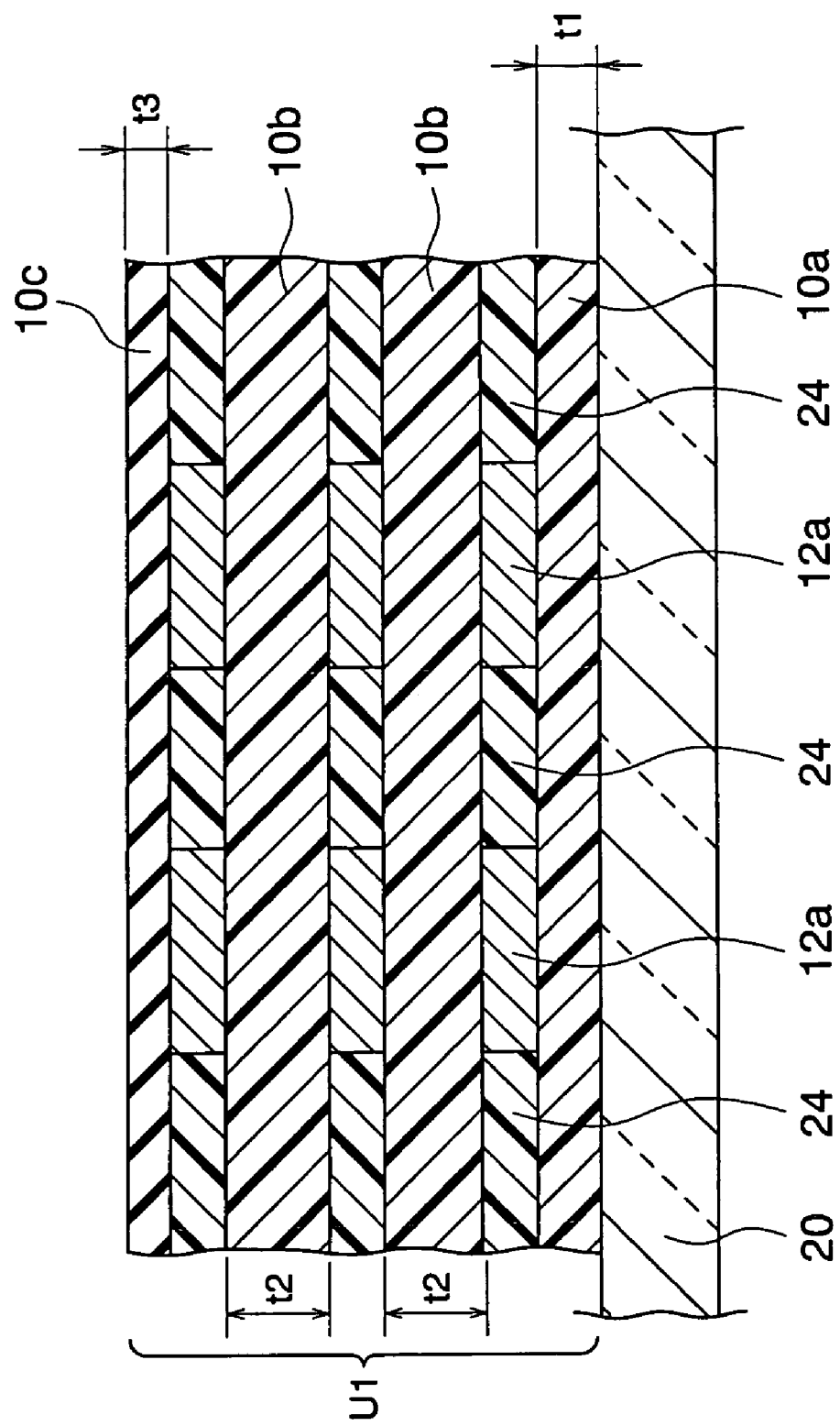
FIG. 4 and FIG. 5 are sectional views of a key part of a first production process of a production method of a multilayer ceramic capacitor according to another embodiment of the present invention.

Also, in the above embodiment, only one intermediate green sheet 10*b* is formed in the multilayer unit U1, however, as shown in FIG. 4, one or more but not more than 50 layers of intermediate green sheets 10*b* and two or more but not more than 51 layers of electrode pattern layers 12*a* (including blank pattern layers 24) may be formed in one multilayer unit U1. In this embodiment, the same operations and effects as those in the embodiment shown in FIG. 1 to FIG. 3 can be obtained, and since the multilayer unit U1 itself has a large number of stacked electrode pattern layers 12*a*, the number of times of stacking the multilayer units U1 can be reduced and the production steps can be simplified.

Note that components in the multilayer unit U1 according to the embodiment shown in FIG. 4 are in common with those in the multilayer unit U1 according to the embodiment shown in FIG. 1 to FIG. 3, so that same reference numbers are given to the common components and explanations thereon will be omitted. Also, a method of producing a green chip by using the multilayer unit U1 shown in FIG. 4 and producing a multilayer ceramic capacitor 2 shown in FIG. 1 is the same as that in the case of the embodiment shown in FIG. 1 to FIG. 3

Figure 5:
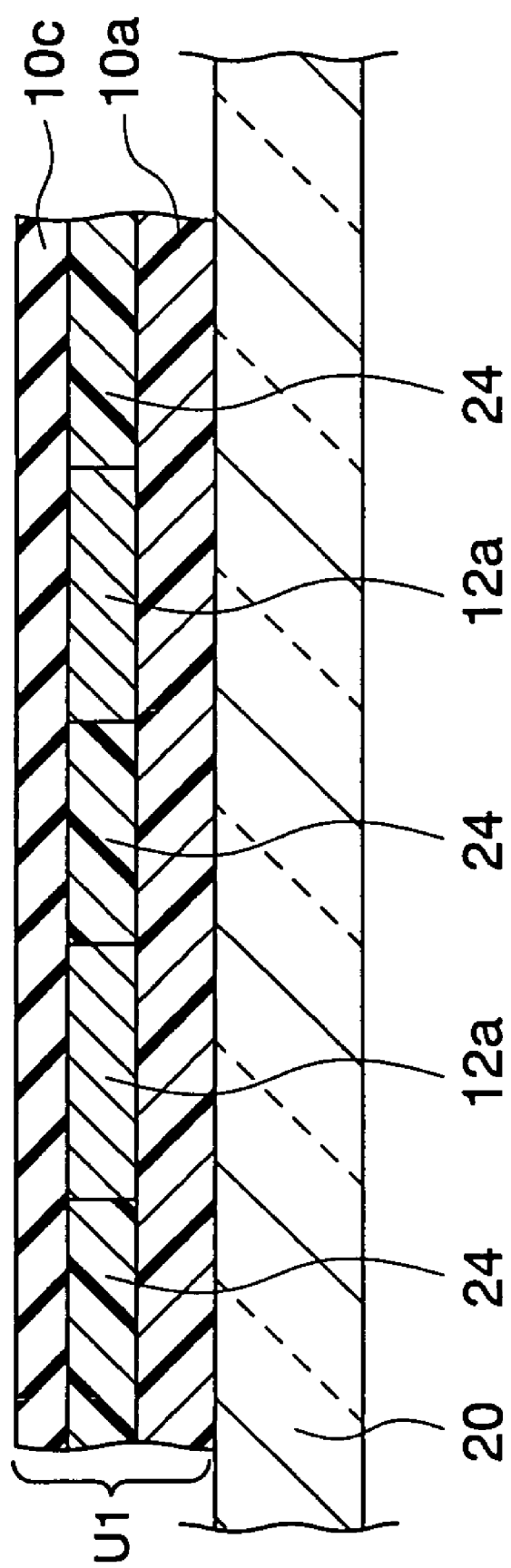

FIG. 5 is a production method according to still another embodiment of the present invention. The method of the embodiment is the same as the method shown in FIG. 1 to FIG. 3 except that the multilayer unit U1 is composed of a lower side green sheet 10*a*, electrode pattern layer 12*a* (including a blank pattern layer 24) and an upper side green sheet 10*c*. In this embodiment, an intermediate green sheet 10*b* is not provided in the multilayer unit U1, so that the number of times of stacking the multilayer units U1 may increase, but other than the increase of the production steps, the same operations and effects as those in the method shown in FIG. 1 to FIG. 3 can be obtained.

Also, in the above embodiment, the blank pattern layer 24 is formed on spaces not formed with a pattern on the electrode pattern layer 12*a*, but the blank pattern does not have to be always formed in the present invention, and basic operations and effects of the present invention can be obtained even when the blank pattern layer is not formed. Note that by forming the blank pattern layer 24, a level difference is not formed on a green sheet even when a green sheet 10*b* or 10*c* is formed on the electrode pattern layer 12*a*, so that a chip shape after stacking becomes also preferable.

Note that when forming the blank pattern layer 24, a resin included in the green sheet 10*a* or 10*b* on the lower side thereof is cured, so that it is hard to be affected by sheet attack by a solvent of a printing paste for forming the blank pattern layer 24, which is effective for preventing short-circuiting defectives.

EXAMPLES

Below, the present invention will be explained based on further detailed examples, but the present invention is not limited to the examples.

First, respective pastes below were prepared.

Thermosetting Resin Containing Dielectric Paste A1

As a dielectric material, $BaTiO_3$ (BT02 powder having an average particle diameter of 0.2 µm, made by Sakai Chemical Industry Co., Ltd.) as a main component and subcomponents were prepared. As the subcomponents of the dielectric material, 2 moles of $Y_2O_3$, 2 moles of MgO, 0.4 mole of MnO, 0.1 mole of $V_2O_5$ and 3 moles of $(Ba_{0.6}Ca_{0.4})SiO_3$ with respect to 100 moles of the main components were used.

100 parts by weight of the dielectric material, 1 part by weight of a dispersant (a polymer based dispersant, SN5468 made by SAN NOPCO Limited) and 100 parts by weight of ethanol were put in a polyethylene container with zirconia balls (2 mmϕ) and mixed for 16 hours to obtain a dielectric mixed solution.

The dielectric mixed solution was dried at a drying temperature of 120° C. for 12 hours, so that a dielectric powder was obtained. 100 parts by weight of the dielectric powder, 50 parts by weight of MEK as a solvent, 20 parts by weight of toluene as a solvent and 1 part by weight of a block type dispersant (JP4 made by Unichema) were mixed by a ball mill for four hours to bring first dispersion.

A dispersed substance after the first dispersion was added with 10 parts by weight of a thermosetting acrylic resin (a methacrylic acid alkyl ester copolymer resin, made by Nippon Carbide Industries CO., Inc.) and 1 part by weight of an amine based curing agent (made by Nippon Carbide Industries CO., Inc.) and mixed by a ball mill for 16 hours to bring secondary dispersion, so that a thermosetting resin containing dielectric paste A1 was obtained.

Thermoplastic Resin Containing Dielectric Paste B1

Other than not adding a thermosetting acrylic resin to the dispersed substance after the first dispersion and adding 10 parts by weight of a thermoplastic acrylic resin (an MM747 resin, made by FUJIKURA KASEI Co., Ltd.), a thermoplastic resin containing dielectric paste B1 was obtained in the same way as in the thermoplastic resin containing dielectric paste A1.

UV Curable Resin Containing Dielectric Paste A2

Other than adding 10 parts by weight of an ultraviolet (UV) curing acrylic resin (a methacrylic acid alkyl ester copolymer resin, made by Nippon Carbide Industries CO., Inc.) instead of a thermosetting acrylic resin to the dispersed substance after the first dispersion, a UV curable resin containing dielectric paste A2 was obtained in the same way as in the thermosetting resin containing dielectric paste A1.

Electron Beam Curable Resin Containing Dielectric Paste A3

Other than adding 10 parts by weight of an electron beam curing acrylic resin (a methacrylic acid alkyl ester copolymer resin, made by Nippon Carbide Industries CO., Inc.) instead of a thermosetting acrylic resin to the dispersed substance after the first dispersion, an electron beam curable resin containing dielectric paste A3 was obtained in the same way as in the thermosetting resin containing dielectric paste A1.

Thermosetting Resin Containing Dielectric Paste A4

Other than adding 10 parts by weight of a thermosetting acrylic resin (a bisphenol A epoxy resin, made by Dainippon Ink and Chemicals, Incorporated) instead of a thermosetting acrylic resin to the dispersed substance after the first dispersion, a thermosetting resin containing dielectric paste A4 was obtained in the same way as in the thermosetting resin containing dielectric paste A1.

Thermosetting Resin Containing Dielectric Paste A5

Other than adding 10 parts by weight of a thermosetting urethane acrylate resin (made by Dai-Ichi Kogyo Seiyaku Co., Ltd.) instead of a thermosetting acrylic resin to the dispersed substance after the first dispersion, a thermosetting resin containing dielectric paste A5 was obtained in the same way as in the thermosetting resin containing dielectric paste A1.

UV Curable Resin Containing Dielectric Paste A6

Other than adding 10 parts by weight of a UV curing urethane acrylate resin (made by TOAGOSEI CO., Ltd.) instead of a thermosetting acrylic resin to the dispersed substance after the first dispersion, a UV curable resin containing dielectric paste A6 was obtained in the same way as in the thermosetting resin containing dielectric paste A1.

Electron Beam Curable Resin Containing Dielectric Paste A7

Other than adding 10 parts by weight of an electron beam curing urethane acrylate resin (made by TOAGOSEI CO., Ltd.) instead of a thermosetting acrylic resin to the dispersed substance after the first dispersion, an electron beam curable resin containing dielectric paste A7 was obtained in the same way as in the thermosetting resin containing dielectric paste A1.

Electrode Pattern Layer Paste

First, as additive (subcomponent) materials, 1.48 parts by weight of (Ba, Ca)$SiO_3$, 1.01 parts by weight of $Y_2O_3$, 0.72 part by weight of $MgCO_3$, 0.13 part by weight of MnO and 0.045 part by weight of $V_2O_5$ were prepared. Next, these additive (subcomponent) materials were mixed to obtain an additive (subcomponent) material mixture.

Next, 100 parts by weight of the additive material mixture, 150 parts by weight of acetone, 104.3 parts by weight of terpineol, and 1.5 parts by weight of a polyethylene glycol based dispersant were mixed to be slurry, and the obtained slurry was ground by a grinding machine (LMZ0.6 type, made by Ashizawa Finetech Ltd.), so that additive slurry was obtained.

Note that grinding of the additives in the slurry was performed by rotating a roller under a condition of a circumferential velocity of 14 m/minute and circulating the slurry between a vessel and a slurry tank. Note that the vessel was filled with $ZrO_2$ beads having a diameter of 0.1 mm by an amount of 80% of the vessel capacity, and the retention time of the entire slurry in the vessel was set to be 5 minutes in the grinding. Note that a median size of the additives after grinding was 0.1 μm.

Next, by using an evaporator, acetone was removed by evaporating from the additive slurry after grinding, so that additive slurry, wherein the additive materials are dispersed in terpineol, was fabricated. Note that additive material concentration in the additive slurry after removing acetone was 49.3 wt %.

Next, 100 parts by weight of nickel powder (having a particle diameter of 0.2 μm, made by JFE Mineral Co., Ltd.), 1.77 parts by weight of the additive slurry, 19.14 parts by weight of $BaTiO_3$ powder (having a particle diameter of 0.05 μm, made by Sakai Chemical Industry Co., Ltd.), 56.25 parts by weight of an organic vehicle, 1.19 parts by weight of a polyethylene glycol based dispersant, 2.25 parts by weight of dioctyl phthalate (a plasticizer), 32.19 parts by weight of isobornyl acetate and 56 parts by weight of acetone were mixed by using a ball mill to be a paste. Next, acetone was removed by evaporating from the obtained paste by using an evaporator and an agitator mixer having a heating mechanism, so that an electrode pattern layer paste was obtained.

Note that mixing by a ball mill was performed under a condition of filling the ball mill with 30 volume % of $ZrO_2$ media with 2 mmφ and 60 volume % of the mixture of the above materials at a circumferential velocity of 45 m/minute for 16 hours. Also, the above organic vehicle was produced by dissolving by stirring 4 parts by weight of an ethyl cellulose resin having a molecular weight of 130000 and 4 parts by weight of an ethyl cellulose resin having a molecular weight of 230000 in 92 parts by weight of isobornyl acetate at 70° C. Namely, the resin content (ethyl cellulose resin content) in the organic vehicle was 8 wt %.

Next, viscosity of the obtained internal electrode paste was measured at 25° C. by using the cone-plate viscometer (made by HAAKE) to obtain viscosity $V_8$ at a shearing rate of 8 $sec^{-1}$ and velocity $V_{50}$ at 50 $sec^{-1}$, respectively. The measurement results were $V_8$=15.5 cps, $V_{50}$=8.5 cps and $V_8/V_{50}$=1.72, and it was confirmed that preferable viscosity for the printing method was obtained.

Blank Pattern Paste

First, additive slurry, wherein additive materials are dispersed in terpineol, was fabricated in the same way as in the internal electrode paste.

Next, 8.87 parts by weight of the additive slurry, 95.70 parts by weight of BaTiO3 powder (BT-B$_{02}$, made by Sakai Chemical Industry Co., Ltd), 104.36 parts by weight of an organic vehicle, 1.0 part by weight of a polyethylene glycol based dispersant, 2.61 parts by weight of dioctyl phthalate (a plasticizer), 19.60 parts by weight of isobornyl acetate, 57.20 parts by weight of acetone and 0.4 part by weight of an imidazoline based surfactant (an antistatic agent) were mixed by using a ball mill to be a paste. Then, by removing acetone by evaporating from the obtained paste by using an evaporator and an agitator mixer having a heating mechanism, a blank pattern paste was obtained. Note that as the above organic vehicle, the same organic vehicle as that in the internal electrode paste was used. Namely an 8 wt % isobornyl acetate solution of an ethyl cellulose resin was used.

Next, viscosity of the obtained blank pattern paste was measured in the same way as that in the internal electrode paste. The measurement results were $V_8$=19.9 cps, $V_{50}$=10.6 cps and $V_8/V_{50}$=1.88, and it was confirmed that preferable viscosity for the printing method was obtained.

Example 1

First, the thermosetting resin containing dielectric paste A1 was coated on a PET film (first supporting sheet), a surface of which is subjected to release processing by a silicone based resin, then, dried to form the lower side green sheet 10a shown in FIG. 2. The sheet was continuously fed into a drying furnace for drying, a temperature in the drying furnace was set at 80° C. and the drying time was 2 minutes. The green sheet was formed, so that the thickness t1 after drying becomes 0.5 µm.

Next, the obtained green sheet was fed to a thermal treatment drying furnace, and thermal curing processing was performed at 100° C. for 15 minutes to cure the thermosetting resin included in the green sheet.

Next, by printing the above internal electrode paste on the green sheet 10a by using a screen printing device and, then, drying under a condition of 90° C. for 10 minutes, an electrode pattern layer 12a having a predetermined pattern was formed. The internal electrode layer was formed, so that the film thickness after drying becomes 1 µm.

Next, on the green sheet 10a formed with the electrode pattern layer 12a, the blank pattern paste is printed on portions not formed with the electrode pattern layer 12a by a screen printing device and, then, dried under a condition of 90° C. for 10 minutes, so that a blank pattern layer 24 was formed.

Next, on the electrode pattern layer 12a as a first layer and the blank pattern layer 24, a sheet was formed by using the thermosetting resin containing dielectric paste A1 by nozzle coating, so that an intermediate green sheet 10b was obtained. The sheet was continuously fed into a drying furnace at 80° C. to dry the solvent. The drying time was 2 minutes. A thickness t2 of the green sheet 10b after drying was 1 µm.

Next, the obtained green sheet 10b was fed to a thermal treatment drying furnace, and thermal curing processing was performed at 100° C. for 15 minutes to cure the thermosetting resin included in the green sheet.

Then, on a surface of the intermediate green sheet 10b, an electrode pattern layer 12a as a second layer and a blank pattern layer 24 were formed in the same way as the electrode pattern layer 12a as a first layer and blank pattern layer 24.

Next, on a surface of the electrode pattern layer 12a as a second layer and blank pattern layer 24 after drying, an upper side green sheet 10c was formed by using the thermoplastic resin containing dielectric paste B1 by nozzle coating. The sheet was continuously fed into a drying furnace at 80° C. to dry the solvent. The drying time was 2 minutes. A thickness t3 of the upper side green sheet 10c after drying was 0.5 µm.

As explained above, a multilayer unit U1 composed of the lower side green sheet 10a, the electrode pattern layer 12a as a first layer and blank pattern layer 24, the intermediate green sheet 10b, the electrode pattern layer 12a as a second layer and blank pattern layer 24 and the upper side green sheet 10c was formed on a carrier sheet 20.

The multilayer unit U1 released from the carrier sheet 20 was prepared by a large number and stacked by thermocompression to obtain a multilayer body, so that the number of stacked electrode layers became 100 in total, and a multilayer body was obtained. A condition at the thermocompression was 100 MPa and 70° C. Next, the obtained multilayer body was cut by a dicing processing machine and a green chip before firing was obtained. Note that, in the present embodiment, existence of sheet attack in the green chip before firing was observed by a later explained method.

Next, the thus obtained green chip was subjected to binder removal processing, firing and annealing (thermal treatment), so that a chip-shaped sintered body was produced.

The binder removal was performed under a condition below.
temperature rising rate: 50° C./hour
holding temperature: 240° C.
holding time: 8 hours
atmosphere: in the air The firing was performed under a condition below.
temperature rising rate: 300° C./hour
holding temperature: 1200° C.
holding time: 2 hours
cooling rate: 300° C./hour
atmosphere gas: a mixed gas of $N_2$ and $H_2$ (5%), wherein a dew point was controlled at 20° C.

The annealing (re-oxidization) was performed under a condition below.
holding time: 3 hours
cooling rate: 300° C./hour
atmosphere gas: a $N_2$ gas, wherein a dew point was controlled at 20° C.

Note that a wetter was used for wetting the atmosphere gas, and the water temperature was 0 to 75° C.

Next, after end surfaces of the chip-shaped sintered body were polished by sand-blast, an In—Ga alloy paste was applied to the end portions and fired to form external electrodes, so that a multilayer ceramic capacitor sample having the configuration shown in FIG. 1 was obtained. The sample after firing had a width of 0.8 mm and a length of 1.6 mm.

Measurement of Existence of Sheet Attack

A degree of sheet attack occurrence was measured on the green chip sample before firing obtained as above. The measurement was made by burying 50 green chip samples in a two-pack type curing epoxy resin, so that side surfaces of the dielectric layers and internal electrodes layers are exposed, and the two-pack type curing epoxy resin was cured. Then, the green chip samples buried in the epoxy resin was polished to a depth of 1.6 mm by using sandpaper. Note that the polishing by sandpaper was performed by using sandpaper of #400, sandpaper of #800, sandpaper of #1000 and sandpaper of #2000 in this order. Then, the surface polished by the sandpaper was subjected to mirror polishing processing by using a diamond paste. The surface polished by the mirror polishing processing was observed at a magnifying power of 400 times by using an optical microscope and an existence of sheet attack was examined. As a result of the observation by an optical microscope, a rate of samples, wherein sheet attack occurred, in all measured samples was considered as a sheet attack rate. The results are shown in Table 1.

Note that whether sheet attack occurred or not was determined by observing whether there is a portion having an extremely thin thickness as 50% of a thickness of other portions or thinner on the green sheet.

Measurement of Short-Circuiting Defective Rate

The short-circuiting defectives were measured by preparing 50 capacitor samples and examining the number of short-circuiting defects.

Specifically, a resistivity value was measured by using an insulation resistance tester (E2377A multimeter made by Hewlett Packard), and samples with a resistivity value of 100 kΩ or smaller were considered as short-circuiting defective samples, and a rate of the short-circuiting defective samples was considered as a short-circuiting defective rate. The results are shown in Table 1.

TABLE 1

|  | Lower Side Green Sheet | Intermediate Green Sheet | Upper side Green Sheet | Sheet Attack (%) | Circuiting Defective Rate (%) |
|---|---|---|---|---|---|
| Example 1 | Dielectric Paste A1 | Dielectric Paste A1 | Dielectric Paste B1 | 0 | 6 |
| Example 2 | Dielectric Paste A2 | Dielectric Paste A2 | Dielectric Paste B1 | 0 | 4 |
| Example 3 | Dielectric Paste A3 | Dielectric Paste A3 | Dielectric Paste B1 | 0 | 7 |
| Example 4 | Dielectric Paste A4 | Dielectric Paste A4 | Dielectric Paste B1 | 0 | 9 |
| Example 5 | Dielectric Paste A5 | Dielectric Paste A5 | Dielectric Paste B1 | 0 | 8 |
| Example 6 | Dielectric Paste A6 | Dielectric Paste A6 | Dielectric Paste B1 | 0 | 5 |
| Example 7 | Dielectric Paste A7 | Dielectric Paste A7 | Dielectric Paste B1 | 0 | 6 |
| Example 8 | Dielectric Paste A1 | Dielectric Paste A1 | Dielectric Paste A1 (*1) | 0 | 6 |
| Example 9 | Dielectric Paste A2 | Dielectric Paste A2 | Dielectric Paste A2 (*1) | 0 | 4 |
| Example 10 | Dielectric Paste A3 | Dielectric Paste A3 | Dielectric Paste A3 (*1) | 0 | 7 |
| Comparative Example 1 | Dielectric Paste B1 | Dielectric Paste B1 | Dielectric Paste B1 | 100 | 100 |
| Comparative Example 2 | Dielectric Paste B1 | Dielectric Paste B1 | Dielectric Paste A1 (*1) | 100 | 98 |
| Comparative Example 3 | Dielectric Paste B1 | Dielectric Paste A1 | Dielectric Paste A1 (*1) | 100 | 94 |
| Comparative Example 4 | Dielectric Paste A1 | Dielectric Paste A1 | Dielectric Paste A1 (*2) | Non-Evaluable | Non-Evaluable |
| Comparative Example 5 | Dielectric Paste A2 | Dielectric Paste A2 | Dielectric Paste A2 (*2) | Non-Evaluable | Non-Evaluable |

Dielectric Pastes A1~A7: including curable resin
Dielectric Paste B1: including thermoplastic resin
(*1) Curing processing is not performed.
(*2) Curing processing is performed.

Example 2

Other than using the UV curable resin containing dielectric paste A2 as a dielectric paste for forming the lower side green sheet and intermediate green sheet and irradiating an ultraviolet ray as the curing processing, green chip samples and capacitor samples were produced in the same method as in the example 1 and the same measurement was made. The results are shown in Table 1.

Example 3

Other than using the electron beam curable resin containing dielectric paste A3 as a dielectric paste for forming the lower side green sheet and intermediate green sheet and irradiating an electron beam as the curing processing, green chip samples and capacitor samples were produced in the same method as in the example 1 and the same measurement was made. The results are shown in Table 1.

Example 4

Other than using the thermosetting resin containing dielectric paste A4 as a dielectric paste for forming the lower side green sheet and intermediate green sheet, green chip samples and capacitor samples were produced in the same method as in the example 1 and the same measurement was made. The results are shown in Table 1.

Example 5

Other than using the thermosetting resin containing dielectric paste A5 as a dielectric paste for forming the lower side green sheet and intermediate green sheet, green chip samples and capacitor samples were produced in the same method as in the example 1 and the same measurement was made. The results are shown in Table 1.

Example 6

Other than using the UV curable resin containing dielectric paste A6 as a dielectric paste for forming the lower side green sheet and intermediate green sheet and irradiating an ultraviolet ray as the curing processing, green chip samples and capacitor samples were produced in the same method as in the example 1 and the same measurement was made. The results are shown in Table 1.

Example 7

Other than using the electron beam curable resin containing dielectric paste A7 as a dielectric paste for forming the lower side green sheet and intermediate green sheet and irradiating an electron beam as the curing processing, green chip samples and capacitor samples were produced in the same method as in the example 1 and the same measurement was made. The results are shown in Table 1.

Example 8

Other than using the thermosetting resin containing dielectric paste A1 as a dielectric paste for forming the lower side green sheet, intermediate green sheet and the upper side green sheet, using a thermal treatment drying furnace as curing processing of the lower side green sheet and intermediate green sheet and not performing curing processing on the upper side green sheet, green chip samples and capacitor samples were produced in the same method as in the example 1 and the same measurement was made. The results are shown in Table 1.

Example 9

Other than using the UV curable resin containing dielectric paste A2 as a dielectric paste for forming the lower side green sheet, intermediate green sheet and upper side green sheet, irradiating an ultraviolet ray as curing processing of the lower side green sheet and intermediate green sheet and not performing curing processing on the upper side green sheet, green chip samples and capacitor samples were produced in the same method as in the example 1 and the same measurement was made. The results are shown in Table 1.

Example 10

Other than using the electron beam curable resin containing dielectric paste A3 as a dielectric paste for forming the lower side green sheet, intermediate green sheet and upper side green sheet, irradiating an electron beam as curing processing of the lower side green sheet and intermediate green sheet and not performing curing processing on the upper side green sheet, green chip samples and capacitor samples were produced in the same method as in the example 1 and the same measurement was made. The results are shown in Table 1.

Comparative Example 1

Other than using the thermoplastic resin containing dielectric paste B1 as a dielectric paste for forming the lower side green sheet and intermediate green sheet and not performing curing processing, green chip samples and capacitor samples were produced in the same method as in the example 1 and the same measurement was made. The results are shown in Table 1.

Comparative Example 2

Other than using the thermosetting resin containing dielectric paste A1 as a dielectric paste for forming the upper side green sheet and performing curing processing, green chip samples and capacitor samples were produced in the same method as in the comparative example 1 and the same measurement was made. The results are shown in Table 1.

Comparative Example 3

Other than using the thermosetting resin containing dielectric paste A1 as a dielectric paste for forming the intermediate green sheet and upper side green sheet and performing curing processing, green chip samples and capacitor samples were produced in the same method as in the comparative example 1 and the same measurement was made. The results are shown in Table 1.

Comparative Example 4

Other than using the thermosetting resin containing dielectric paste A1 as a dielectric paste for forming the lower side green sheet, intermediate green sheet and the upper side green sheet and using a thermal processing drying furnace as curing processing, producing of green chip samples and capacitor samples was attempted in the same way as in the respective examples. However, curable resins in cured sheets were not bonded, so that a chip cannot be obtained and evaluation of sheet attack and short-circuiting defectives was not possible.

Comparative Example 5

Other than using the UV curable resin containing dielectric paste A2 as a dielectric paste for forming the lower side green sheet, intermediate green sheet and upper side green sheet and irradiating an ultraviolet ray as curing processing, producing of green chip samples and capacitor samples was attempted in the same way as in the respective examples. However, curable resins in cured sheets were not bonded, so that a chip cannot be obtained and evaluation of sheet attack and short-circuiting defectives was not possible.

Evaluation

As shown in Table 1, it was confirmed that by using a curable resin containing dielectric paste as a dielectric paste for forming the lower side green sheet, it was possible to prevent sheet attack and reduce short-circuiting defectives. Also, as shown in Table 1, it was confirmed that by using a dielectric paste including a not cured curable resin or thermoplastic resin as a dielectric paste for forming the upper side green sheet, the adhesiveness became preferable and stacking becomes easy.

What is claimed is:

1. A production method of a multilayer electronic device, comprising the steps of:
    forming a lower side green sheet having a thickness of 1 µm or less including at least a ceramic powder and a binder of a curable resin on a supporting body;
    curing said curable resin included in said lower side green sheet;
    forming a first electrode pattern layer on a surface of said lower side green sheet;
    forming an intermediate green sheet having a thickness of 1 µm or less including a binder of a curable resin on the electrode pattern layer after forming said electrode pattern layer on said lower side green sheet;
    curing the curable resin in said intermediate green sheet; and
    forming a second electrode pattern layer on said intermediate green sheet;
    wherein:
    two or more said electrode pattern layers are formed on said supporting body via one or more said intermediate green sheet;
    an upper side green sheet including a binder of a curable resin is formed on a topmost electrode pattern layer among the two or more electrode pattern layers;
    a multilayer unit composed of single said lower side green sheet, one or more said intermediate green sheet, two or more said electrode pattern layers and said upper side green sheet is formed on said supporting body;
    without curing the curable resin in said upper side green sheet, two or more said multilayer units released from said supporting body are stacked, so that said lower side green sheet in one multilayer unit contacts said upper side green sheet of another multilayer unit, to form a green chin and, then, said green chip is fired; and
    the thickness of the intermediate green sheet is approximately equal to the sum of the thickness of the lower side green sheet and a thickness of the upper side green sheet.

2. The production method of a multilayer electronic device as set forth in claim 1, wherein the binder of a curable resin included in said upper side green sheet is the same kind as that included in said lower side green sheet and said intermediate green sheet.

3. The production method of a multilayer electronic device as set forth in claim 1, further comprising the step of forming a blank pattern layer on blank portions not formed with said electrode pattern layer on said lower side green sheet before forming said intermediate green sheet or said upper side green sheet on said electrode pattern layer.

4. The production method of a multilayer electronic device as set forth in claim 1, wherein any of said curable resin is any one of a thermosetting resin, an ultraviolet ray curable resin and an electron beam curable resin.

5. A production method of a multilayer electronic device, comprising the steps of:

forming a lower side green sheet having a thickness of 1 µm or less including at least a ceramic powder and a binder of a curable resin on a supporting body;

curing said curable resin included in said lower side green sheet;

forming a first electrode pattern layer on a surface of said lower side green sheet;

forming an intermediate green sheet having a thickness of 1 µm or less including at least a ceramic powder and a binder of a curable resin on said electrode pattern layer;

curing the curable resin in said intermediate green sheet; and forming a second electrode pattern layer on said intermediate green sheet;

wherein:

two or more said electrode pattern layers are formed on said supporting body via one or more said intermediate green sheet;

an upper side green sheet including at least a ceramic powder and a binder of a curable resin is formed on a topmost electrode pattern layer among the two or more electrode pattern layers;

a multilayer unit composed of single said lower side green sheet, one or more but not more than 50 layers of said intermediate green sheet, two or more but not more than 51 layers of said electrode pattern layers and single said upper side green sheet is formed on said supporting body;

without curing the curable resin in said upper side green sheet, two or more said multilayer units released from said supporting body are stacked, so that said lower side green sheet of one multilayer unit contacts said upper side green sheet of another multilayer unit, to form a green chip and, then, said green chip is fired; and the thickness of the intermediate green sheet is approximately equal to the sum of the thickness of the lower side green sheet and a thickness of the upper side green sheet.

* * * * *